MULTISTAGE FLASH EVAPORATOR DISTILLATION APPARATUS AND METHOD AND CONDENSER WITH SPRAY FILM EFFECTS
Filed Oct. 12, 1964
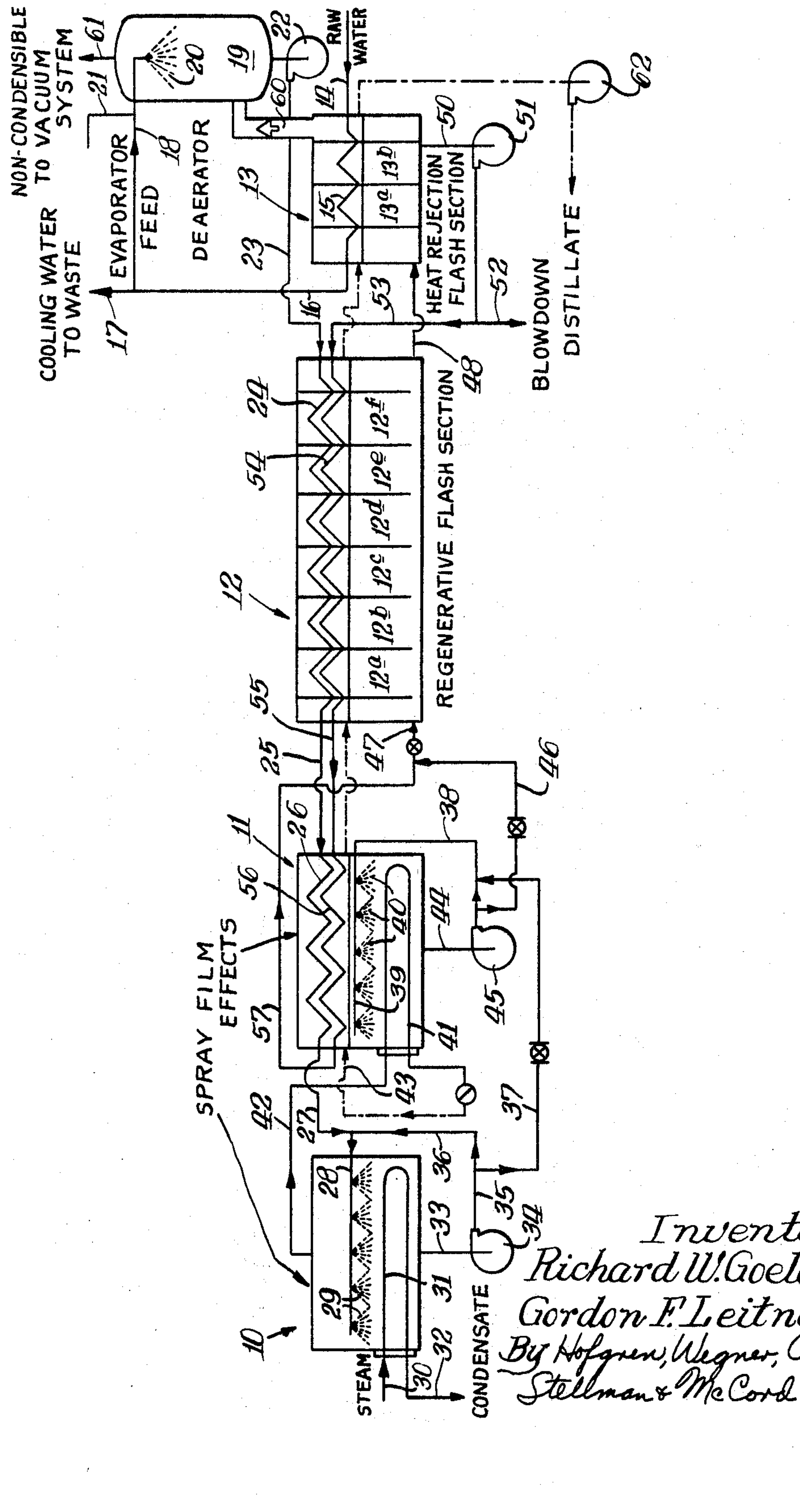
Inventors:-
Richard W. Goeldner,
Gordon F. Leitner,
By Hofgren, Wegner, Allen, Stellman & McCord Attys.

United States Patent Office 3,388,045

Patented June 11, 1968

1

3,388,045
MULTISTAGE FLASH EVAPORATOR DISTILLATION APPARATUS AND METHOD AND CONDENSER WITH SPRAY FILM EFFECTS

Richard W. Goeldner, Brookfield, and Gordon F. Leitner, Milwaukee, Wis., assignors to Aqua-Chem, Inc., a corporation of Wisconsin Filed Oct. 12, 1964, Ser. No. 402,988
3 Claims. (Cl. 202—173)

This invention relates to a distillation apparatus and method and more particularly to such apparatus and method wherein the concentrations of the liquid to be distilled are maintained at or near the lowest point in the areas of highest temperature of the system.

It is a general object of the present invention to produce new and improved distillation apparatus and methods of the character described.

It is a more particular object of the invention to provide an evaporation or distillation system wherein elevated temperatures are used to produce evaporation and wherein the concentrations of the liquid being distilled may be kept to a minimum in the areas of highest temperature. Thus, if the liquid undergoing treatment is salt water, the brine concentration is kept substantially at or near its lowest point in that portion of the apparatus where the highest temperatures are encountered. As brine concentration increases, the temperatures involved in treating the higher salinity brine are lowered.

The desirability of achieving the economies of higher temperature distillation of water particularly have been recognized for some time. One of the difficulties blocking progress in this direction has been the accompanying fact that scale deposits and other actions of salt water deleterious to the apparatus also increase with the increase in temperature. In utilizing the methods and apparatus of the present invention, however, I am able to minimize the deleterious effects on the apparatus in treating salt water at higher temperatures by maintaining the brine concentration in such areas at a low value.

Accordingly, it is another object of the present invention to produce distillation apparatus and methods particularly adapted for the desalting of water wherein the deposit of scale and/or other deleterious effects of salt water on the apparatus may be kept to a minimum.

Other and further objects of the present invention will be readily apparent from the following description and drawing, in which there is shown a schematic diagram of an apparatus designed in accordance with the present invention and suitable for carrying out the process thereof.

While this invention is susceptible of embodiment in many different forms, there is shown in the drawing and will herein be described in detail a specific embodiment, with the understanding that the present disclosure is to be considered as an exemplification of the principles of the invention and is not intended to limit the invention to the embodiment illustrated. The scope of the invention will be pointed out in the appended claims.

While it will be readily apparent to those skilled in the art that the apparatus and process of the present invention may be utilized in treating liquids other than salt water, it will hereinafter be described in an embodiment designed to treat salt water to produce fresh water therefrom.

Referring now to the drawing, there is shown a film evaporator 10, another film evaporator 11, a multi-stage flash evaporator 12, and a heat rejection flash evaporator 13. Each of the evaporators is connected to the other evaporators in the manner hereinafter described to provide a unitary apparatus capable of carrying out the processes of the invention.

Raw salt water is introduced into the apparatus through the inlet 14 connected to a condenser 15 in each of the

2 stages 13*a* and 13*b* of the heat rejection flash evaporator 13. The major portion of the raw salt water is then passed to waste through line 17 and a minor portion thereof passes through the line 18 into a deaerator 19 into which it is issued in the form of a spray through the spray head 20. If desired, acid may be introduced into the raw feed water through line 21 immediately prior to its entry into the deaerator 19. The addition of acid assists in reducing the formation of calcium carbonate and magnesium hydroxide scales. Acid treatment, however, does not reduce the formation of calcium sulfate scale. As will become apparent, however, utilization of the apparatus and methods of the present invention serve substantially to reduce the formation of calcium sulfate scale. After passing through the deaerator, the water is pumped by pump 22 into line 23 which is connected to a first condenser 24 which passes through each of the stages 12*a*–12*f* of the flash evaporator 12. The condenser 24 is one of a pair of condensers in the flash evaporator 12 and the second part of the dual condenser will be described subsequently.

After passing sequentially through each of the stages of the flash evaporator 12 the feed water passes into line 25 in turn connected to a condenser 26 located in the first spray film evaporator 11. After serving to condense vapors formed in the evaporator 11 the feed water passes into line 27 connected to a conduit 28 located within the spray film evaporator 10 from whence it issues in the form of spray 29. Heating steam is introduced into the evaporator 10 through line 30 and passes therein through the tubes of a heat exchanger 31 to heat the surfaces thereof and hence to vaporize a portion of the water sprayed thereon from the spray 29. Condensate steam exits from the heat exchanger through the line 32.

Water unevaporated in the evaporator 10 passes into a line 33 at the bottom thereof and thence into a pump 34 which discharges into a line 35 connected to a first recirculation line 36, which connects to the conduit 28 and also to a second line 37 connected to the recirculation line 38 of the other spray film evaporator 11. Thus a portion of the salt water is recirculated in the spray film evaporator 10 and the balance is directed to the spray film evaporator 11.

The line 38 is connected to a conduit 39 within the spray film evaporator 11 and which, of course, operates at lower temperature and pressure than the evaporator 10. The evaporator 11 is provided with a plurality of sprays 40 for spraying the water on a heat exchanger 41 therein. The heat exchanger 41 is provided with heat from the water vapor produced in the spray film evaporator 10 and the vapors so produced pass through the line 42 into the heat exchanger 41 and thence into the distillate line 43 which passes through the spray film evaporator 11 and the flash evaporators 12 and 13 for collecting distillate formed therein.

Water unevaporated in the spray film evaporator 11 passes out of the bottom thereof through the line 44 and is moved by pump 45 both into the recirculation line 38 and into a second line 46 which connects to a line 47 communicating with the first flash chamber 12*a* of the flash evaporator 12. Water passing sequentially through the chambers of the flash evaporator 12 is, of course, caused to flash and evaporate therein in a manner well known to the art, and the unevaporated portion exits through the line 48 which in turn is connected to the first stage 13*a* of the heat rejection flash evaporator 13.

The brine exits from the evaporator 13 through the line 50 and is moved by pump 51 to a blowdown 52 and into a recirculation line 53. The arrangement is such that the major portion of the brine is recirculated into the line 53 which connects to the second condenser 54 in the flash chamber 12. From the condenser 54 the recirculating brine passes into a line 55 connected to a second condenser 56 in the spray film evaporator 11 and thence passes by line 57 into line 47 for re-introduction into the first stage 12*a* of the flash evaporator 12. Noncondensible gases in the system pass through vents 60 into the deaerator 19 and thence out into the vacuum system by line 61. Distillate collected in all the evaporators is moved by pump 62 to a suitable storage area.

While it will be clear to those skilled in the art that many forms of evaporators can be used for the evaporators 10 and 11, wherein heat is transferred to water at its boiling point, the spray film evaporators are shown for illustrative purposes and may have the general construction of the evaporators of the type shown in the copending application of Loebel et al., Ser. No. 246,479, filed Dec. 21, 1962. The flash evaporators may also be of usual construction and have, for example, a general configuration in the form generally shown in the application of Reid Ewing, Ser. No. 779,516, filed Dec. 5, 1958. The flash evaporators, of course, may have more or less stages than those shown in the drawing.

As an example of operation, the raw water is heated in the heat rejection flash evaporator 13 so that its temperature in passing through the line 23 is of the order of 100° F. In condensing vapors formed in each of the stages of the flash evaporator 12 the feed water is heated to the neighborhood of 235° F. and enters the condenser section 26 of the evaporator 11 at that temperature. The water is further heated in the evaporator 11 so that it enters the evaporator 10 at a temperature of the order of 265° F. It is further heated, of course, by its being sprayed as a film on the heated surfaces of the heat exchanger 31. The water vapor generated in the evaporator 10 is sufficient to heat the heat exchanger 41 to a temperature of the order of 260° F. to assist in the evaporation of feed water sprayed thereon through the sprays 40. Water entering the flash evaporator 12 through line 47 will then have a temperature of the order of 250° F. It will be cooled somewhat by the passage through the flash evaporator and the subsequent passage through the heat rejection flash evaporator 13 so as to exit therefrom at a temperature of the order of 100° F.

As an example of flow rates, the feed water moved by the pump 22 may be at the rate of approximately twenty-four gallons per hour. As it enters the conduit 28 of the evaporator 10 its flow is augmented by the recirculated water in the line 36. About one gallon per hour of distillate is formed in the spray film evaporator 10. Hence, approximately twenty-three gallons per hour of water pass through the line 37. At the flow rates described, the salinity of the water in the line 37 will be approximately $^{24}/_{23}$ of the salinity of the raw feed water.

About another gallon per hour of distillate is formed in the spray film evaporator 11 and hence the flow into the line 46 is approximately twenty-two gallons per hour and the salinity is $^{24}/_{22}$ that of the original feed water.

Approximately sixty gallons per hour of brine are recirculated by the pump 51 into the line 53 and this is combined with the twenty-two gallons in the line 47 for introduction into the first stage 12*a* of the flash chamber. Thus, approximately eighty-two gallons per hour flow through the flash evaporator 12 which will make about ten gallons of distillate per hour. Thus, approximately seventy-two gallons per hour of brine flow into the first stage 13*a* of the heat rejection flash evaporator 13.

A very small portion of distillate is formed in the heat rejection flash section and hence may be disregarded for the moment.

The twelve gallons of distillate formed per hour are, of course, handled by the distillate pump 62 and the recirculating pump 51 and thus direct approximately twelve gallons per hour to blowdown with a salinity of about $^{24}/_{12}$ of the salinity of the feed water to provide a balanced system.

It is, of course, understood that the foregoing description of temperatures and flow rates is for the purpose of example only but the example serves to illustrate the fact that the lowest concentration of salt (assuming salt water is the liquid undergoing treatment) is found in the evaporator 10 where the temperatures are the highest and as the salinity of the water undergoing treatment increases, the treatment is carried on in areas of lower temperature thereby accomplishing the results as expressed in the objects of the invention.

I claim:

1. A distillation system comprising means forming a flash evaporator having a plurality of stages, dual condenser means and a flash chamber in each stage; means forming a first spray film evaporator having a fluid heated conduit therein, means for spraying water onto said conduit, dual condenser means in said first spray film evaporator; means forming a second spray film evaporator having a fluid heated conduit therein and means for spraying water onto said conduit in said second spray film evaporator; means for passing water to be evaporated sequentially through one of said condenser means in each of said stages, then into one of the condenser means in the first spray film evaporator and then into the spraying means in the second spray film evaporator, means for passing a heated fluid through the conduit in the second spray film evaporator to heat the same and cause a portion of the water sprayed thereon to evaporate to form a water vapor, means for passing said portion of the water vapor through the conduit in the first spray film evaporator to heat the same, means for passing water unevaporated in said second spray film evaporator into the spraying means of the first spray film evaporator, means for passing a portion of the water unevaporated in said first spray film evaporator sequentially through said flash chambers of the flash evaporator, means for passing to waste a portion of the water remaining unevaporated after passing through the flash chambers of the flash evaporator and for passing the remaining portion sequentially through the other condenser means in each stage of the flash evaporator and then through the other condenser means of the first spray film evaporator, and means for reintroducing the water sequentially through the flash chambers after it has passed through said other condenser means.

2. A distillation system comprising means forming a flash evaporator having a plurality of stages, dual condenser means and a flash chamber in each stage; first film evaporator means having dual condenser means therein, a heated surface in said first film evaporator and spray means for applying liquid to be evaporated as a film over said heated surface; second film evaporator means having a heated surface therein and spray means for applying liquid to be evaporated as a film over said heated surface therein; means for passing dearated raw liquid through one of said condenser means in each of said stages and through one of said condenser means in said first film evaporator means; said raw liquid then passing into the spray means in said second film evaporator means for spraying over the heated surface therein for vaporizing some of said raw liquid; said vapor from said second film evaporator means being passed to the first film evaporator means as the heat source for the heated surface therein; means for passing unevaporated liquid from said second film evaporator means into the spray means for said first film evaporator means for spraying over said heated surface therein for vaporizing some of said liquid; means for passing unevaporated liquid from said first film evaporator means sequentially through the flash chambers of the flash evaporator; means for passing to waste a portion of the liquid remaining unevaporated after passing through said flash chambers and for passing the remaining portion thereof sequentially through the other condenser means in each stage of the flash evaporator and through the other condenser means in the first film evaporator means; and means for reintroducing the liquid sequentially through the flash chambers after it has passed through said other condenser means in the first film evaporator means.

3. A distillation system comprising means forming a flash evaporator having a plurality of stages, condenser means and a flash chamber in each stage; first film evaporator means having condenser means therein, a heated surface in said first film evaporator means and means for applying liquid to be evaporated as a film over said heated surface; second evaporator means having a heated surface therein and spray means for applying liquid to be evaporated as a film over said heated surface therein; means for passing deaerated raw liquid through said condenser means in each of said stages and through said condenser means in said first film evaporator means; said raw liquid then passing into the spray means in said second film evaporator means for spraying over the heated surface therein for vaporizing some of said raw liquid; said vapor from said second film evaporator means being passed to the first film evaporator means as the heat source for said heated surface in said first film evaporator means; means for passing a portion of the unevaporated liquid from said second film evaporator means into the spray means for said first film evaporator means for spraying over said heated surface therein for vaporizing some of said liquid; means for passing a portion of the unevaporated liquid from said first film evaporator means sequentially through the flash chambers of the flash evaporator; and means for passing to waste a portion of the liquid remaining unevaporated after passing through said flash chambers and for recycling the remaining portion thereof through the condenser means in said flash evaporator and in said first film evaporator means.

References Cited

UNITED STATES PATENTS

| | | | |
|---|---|---|---|
| 2,441,361 | 5/1948 | Kirgan | 202—181 |
| 2,759,882 | 8/1956 | Worthen et al. | 202—174 |
| 2,921,004 | 1/1960 | Wood | 203—10 |
| 3,119,752 | 1/1964 | Checkovich | 203—11 |
| 3,152,053 | 10/1964 | Lynam | 202—173 |
| 3,245,883 | 4/1966 | Loebel | 203—11 |
| 3,320,137 | 5/1967 | Jebens et al. | 202—173 |

NORMAN YUDKOFF, *Primary Examiner.*

F. E. DRUMMOND, *Assistant Examiner.*